United States Patent
Barker et al.

(10) Patent No.: US 8,201,151 B2
(45) Date of Patent: Jun. 12, 2012

(54) METHOD AND SYSTEM FOR PROVIDING POST-MORTEM SERVICE LEVEL DEBUGGING

(75) Inventors: Kevin Spencer Barker, Raleigh, NC (US); Stefan Georg Derdak, San Jose, CA (US); Ramani Mathrubutham, Milpitas, CA (US); Xiaochun Mei, Palo Alto, CA (US); Aaron Higuchi Miller, Mountain View, CA (US); Thomas Pollinger, San Mateo, CA (US); Juliana Hing Sze Tsang, San Lorenzo, CA (US)

(73) Assignee: International Business Machines Corporation, Armonk, NY (US)

( * ) Notice: Subject to any disclaimer, the term of this patent is extended or adjusted under 35 U.S.C. 154(b) by 1208 days.

(21) Appl. No.: 11/960,703

(22) Filed: Dec. 20, 2007

(65) Prior Publication Data

US 2009/0164978 A1    Jun. 25, 2009

(51) Int. Cl.
G06F 9/44    (2006.01)
(52) U.S. Cl. ........ 717/129; 717/124; 717/128; 717/131; 712/244
(58) Field of Classification Search .................. 717/128, 717/129
See application file for complete search history.

(56) References Cited

U.S. PATENT DOCUMENTS

| | | | | |
|---|---|---|---|---|
| 5,455,949 | A * | 10/1995 | Conder et al. | 712/234 |
| 6,477,665 | B1 * | 11/2002 | Bowman-Amuah | 714/39 |
| 6,658,650 | B1 * | 12/2003 | Bates | 717/127 |
| 6,802,054 | B2 | 10/2004 | Faraj | 717/128 |
| 6,978,444 | B1 | 12/2005 | Farchi et al. | 717/129 |
| 7,039,644 | B2 | 5/2006 | Hind et al. | 707/101 |
| 7,131,113 | B2 | 10/2006 | Chang et al. | 717/128 |
| 7,360,120 | B2 * | 4/2008 | De Pauw et al. | 714/45 |
| 7,506,315 | B1 * | 3/2009 | Kabadiyski et al. | 717/128 |
| 7,526,760 | B1 * | 4/2009 | Daynes et al. | 717/153 |
| 7,606,826 | B2 * | 10/2009 | Li et al. | 1/1 |
| 7,644,395 | B1 * | 1/2010 | Frey et al. | 717/128 |
| 7,644,414 | B2 * | 1/2010 | Smith et al. | 719/328 |
| 7,681,182 | B1 * | 3/2010 | Mistry et al. | 717/132 |
| 7,707,557 | B1 * | 4/2010 | Nikolov | 717/130 |
| 7,992,133 | B1 * | 8/2011 | Theroux et al. | 717/124 |
| 2002/0007428 | A1 * | 1/2002 | Chilton | 710/52 |
| 2003/0088626 | A1 * | 5/2003 | Gupta et al. | 709/206 |
| 2004/0015880 | A1 | 1/2004 | Floyd et al. | 717/128 |
| 2005/0289400 | A1 | 12/2005 | Kimura | 714/45 |
| 2006/0059146 | A1 | 3/2006 | McAllister et al. | 707/6 |

(Continued)

OTHER PUBLICATIONS

Title: Efficient model-driven service brokering using Web services, author: K. Cheng et al, source: IEEE, dated: Jul. 6, 2004.*

(Continued)

*Primary Examiner* — Chameli Das
(74) *Attorney, Agent, or Firm* — Samuel K. Simpson; Patent Ingenuity, P.C.

(57) ABSTRACT

A computer program product comprises a computer useable medium. The computer useable medium has a computer readable program such that when the computer readable medium is executed on a computer, the computer is caused to configure an interceptor at a service invocation point corresponding to a component service of a software application. Further, the computer is caused to record, at the interceptor, data in a trace file. The data is associated with a service invocation at the service invocation point. Finally, the computer is caused to provide the trace file to a service level debugger that navigates through the trace file.

8 Claims, 5 Drawing Sheets

U.S. PATENT DOCUMENTS

| | | |
|---|---|---|
| 2006/0129885 A1 | 6/2006 | Bozak et al. ............... 714/15 |
| 2006/0150163 A1 | 7/2006 | Chandane |
| 2007/0083548 A1* | 4/2007 | Li et al. ............... 707/102 |
| 2007/0100967 A1* | 5/2007 | Smith et al. ............... 709/219 |
| 2007/0271572 A1* | 11/2007 | Gupta et al. ............... 719/313 |
| 2009/0013312 A1* | 1/2009 | Albert et al. ............... 717/128 |
| 2009/0172636 A1* | 7/2009 | Griffith et al. ............... 717/113 |

OTHER PUBLICATIONS

"Java™ Problem Determination for IBM J2SE V5 32-bit JVM"; IBM Software Group; Sep. 11, 2006, pp. 1-11.

* cited by examiner

METHOD AND SYSTEM FOR PROVIDING POST-MORTEM SERVICE LEVEL DEBUGGING

BACKGROUND

1. Field

This disclosure generally relates to software development. More particularly, the disclosure relates to problem determination ("PD") for handling software errors.

2. General Background

PD is an approach utilized by software developers to find bugs, i.e., errors, in software code. The current PD methodology involves debugging and/or reading output generated by the software. Examples of this output include a trace file, output on a screen display, etc.

Debugging involves starting a software application or application server in a special mode. Further, debugging involves the use of setting break points in this special mode so that the software application or application server will stop at the break points during the execution of the software code. An example of such software code may be business logic utilized in a business transactional system. When the software application or application server stops at a break point, an analysis can be performed of the current state of the execution at the particular break point. As an example, the values of particular variables can be analyzed at the break point. The execution of the code can be stepped through, e.g., one line at a time, to analyze how the state of these variables changes in response to each subsequent line of code after the break point. Further, the execution context can be changed so that the software application or application server can choose different execution paths.

PD by output is normally performed by reading a trace file in a text editor. Accordingly, the text editor is helpful in performing text searches for exception or execution related key words. The portions found by the text editor can then be filtered out so that particular parts of the trace filed can be focused on. For example, a trace filed can be searched for traces regarding a particular thread. Anything unrelated to that particular thread can be filtered outs so that the PD analysis can focus on the traces for the thread. Another example involves filtering out a trace file for everything except for traces generated by a particular component, e.g., a logger.

With respect to software product support, a support team utilizing PD with a trace file is often preferable to debugging because of the communication barrier, e.g., firewall, that often exists between the support team at the software vendor site and the customer at the customer site. Budgetary concerns normally prevent the support team traveling to the customer site as a large expense could be incurred for travel in each reporting case. Further, customer policy may prevent support team visits because of the sensitivity of the customer's data and production environment. The customer normally does not allow PD to be performed by the support team of a software vendor in the customer's live system.

Further, utilizing the traditional debugging methodology for PD in complex software systems built on top of a Service Oriented Architecture ("SOA") presents a number of drawbacks. One drawback is with respect to the traditional debugging methodology being utilized at the source code level. When end users develop an SOA application, they see assembly diagrams of services that illustrate what those services are, how they are connected with each other, and what types of invocation result when the services are invoked (e.g., synchronous, asynchronous, etc.). As an SOA service is built on top of many layers of supporting components, debugging at the source code level is a very big challenge to the end user.

Another drawback is that the traditional debugging methodology needs a production system to be in a special mode. For example, to debug an application server, the application server needs to be started with the debugging option turned on. The performance impact on the production system is so significant that a customer will not allow debugging on its running system.

Although analysis through a trace file is preferable to the traditional debugging methodology, such analysis also has drawbacks. For instance, a trace file is normally difficult to understand. Traditionally, the trace file can only be understood by the person who developed the application or component that generates certain trace. This presents quite a bit of difficulty when many people are involved in the development. As an example, an enterprise software product could be developed by hundreds, if not thousands of people. To scale the development, the product is typically developed through many components. A developer typically only understands the component that he or she develops. Therefore, that developer will typically only understand the trace generated by his or her component.

Another drawback of the traditional trace analysis involves the tooling that is utilized. For instance, the tooling used to read a trace file typically is a simple text editor, which does not have much logic to help analyze a trace file. Even for a product that has a log analyzer to analyze the log/trace file, the logic is specific to the product or certain problem type. Accordingly, the current tooling does not help with understanding the high level execution logic and the cause of a problem.

Finally, the utilizing both the traditional debugging methodology and the traditional trace analysis presents additional drawbacks. Trace based PD and debugging based PD are two separated activities. The tooling utilities are very different. The knowledge learned from one activity can not be automatically applied to the other activity.

SUMMARY

In one aspect of the disclosure, a computer program product comprises a computer useable medium. The computer useable medium has a computer readable program such that when the computer readable medium is executed on a computer, the computer is caused to configure an interceptor at a service invocation point corresponding to a component service of a software application. Further, the computer is caused to record, at the interceptor, data in a trace file. The data is associated with a service invocation at the service invocation point. Finally, the computer is caused to provide the trace file to a service level debugger that navigates through the trace file.

In another aspect of the disclosure, a process is provided. The process configures an interceptor at a service invocation point corresponding to a component service of a software application. Further, the process records, at the interceptor, data in a trace file. The data is associated with a service invocation at the service invocation point. Finally, the process provides the trace file to a service level debugger that navigates through the trace file.

In yet another aspect of the disclosure, a system is provided. The system has an interceptor that records, in a trace file, data associated with a service invocation. The interceptor is located at a service invocation point corresponding to a component service of a software application. The service invocation is at the service invocation point. The system also has a service level debugger that navigates through the trace file.

DRAWINGS

The above-mentioned features of the present disclosure will become more apparent with reference to the following description taken in conjunction with the accompanying drawings wherein like reference numerals denote like elements and in which.

DETAILED DESCRIPTION

A post-mortem debugger for SOA is provided to allow for trace file reading to be combined with a debugger user interface ("UI"). One or more trace files are utilized to drive the debugging process. As a trace file records what happens when a problem occurs, the post-mortem debugger debugs data after the problem arises. Further, the debugging is at the service level rather than the source code level. Accordingly, each service invocation is treated as an atomic step of debugging as opposed to each line of source code. Therefore, the debugger is a service level debugger. The service invocation is monitored, and a sufficient amount of information is generated in the one or more trace files so that the information can be viewed and navigated in the service level debugger.

As a result, the trace data can be read and navigated in a debugger UI. Further, debugging can be performed without making the application server operate in a special debugger mode. In addition, the ability to debug at the service level rather than the source code level is more natural to the end user that develops an SOA system by assembling services together.

Figure 1:
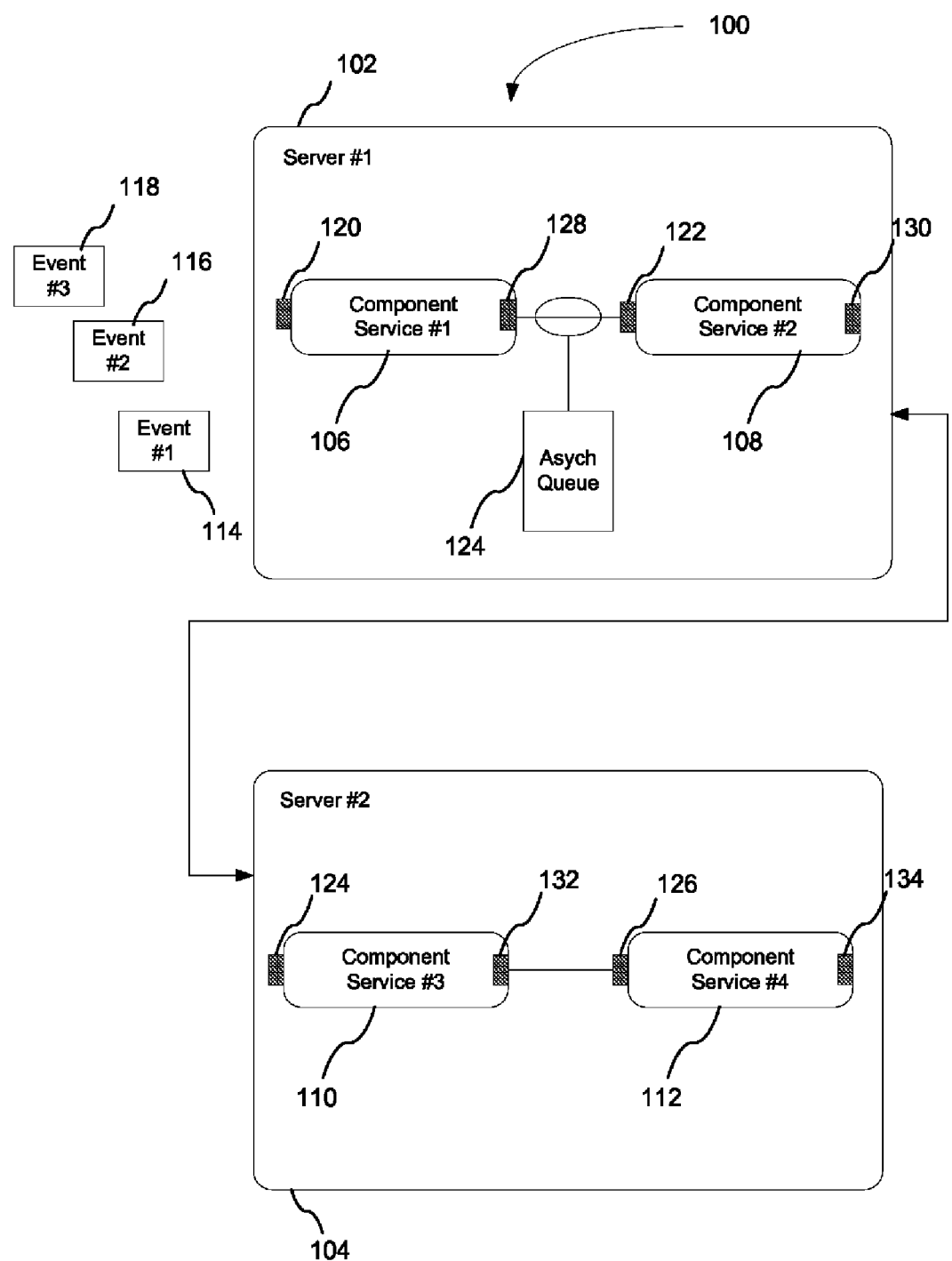
FIG. 1 illustrates an assembly configuration of a plurality of application servers.

FIG. 1 illustrates an assembly configuration 100 of a plurality of application servers. In one embodiment, the plurality of application servers is built upon an SOA standard. An SOA system can be composed by loosely coupled services. A visualization of the assembly configuration 100 helps developers in the software development process. In particular, a UI provides the visualization of the assembly configuration 100. This UI is utilized as the service level debugger to read and navigate one more trace files, and allows the user to interact with the runtime server to invoke services.

The assembly configuration 100 includes a first server 102 and a second server 104. The first server 102 communicates with the second server 104. Further, the first server 102 includes a first component service 106 that communicates with a second component service 108. In one embodiment, an asynchronous queue 124 is utilized to process events such as a first event 114, a second event 116, and a third event 118. In addition, the second server 104 includes a third component service 110 and a fourth component service 112.

As services in SOA are loosely coupled, a service invocation can be intercepted. Therefore, an interceptor is added to each of the component services to intercept the service invocations for the respective component service. In one embodiment, the interceptor records the service invocation in the trace file with details of an invocation context, which is data passed back and forth from a caller service to a callee service. When the service level debugger reads/displays trace files, the invocation context will be utilized to navigate the traces.

Each of the component services has service invocation points such as an interface point and a reference point. For example, the first component service 106 has a first interface point 120 and a first reference point 128, the second component service 108 has a second interface point 122 and a second reference point 130, the third component service 110 has a third interface point 124 and a third reference point 132, and the fourth component service 112 has a fourth interface point 126 and a fourth reference point 134.

For example, a first interface 120 is utilized by the first component service 106 to interact with an interceptor to intercept the service invocations for the first interceptor 120, a second interface 122 is utilized by the second component service 108 to interact with an interceptor to intercept the service invocations for the second interceptor 108, a third interface 124 is utilized by the third component service 110 to interact with an interceptor to intercept the service invocations for the third interceptor 124, and a fourth interface 126 is utilized by the fourth component service 112 to interact with an interceptor to intercept the service invocations for the fourth interceptor 126.

Figure 2:
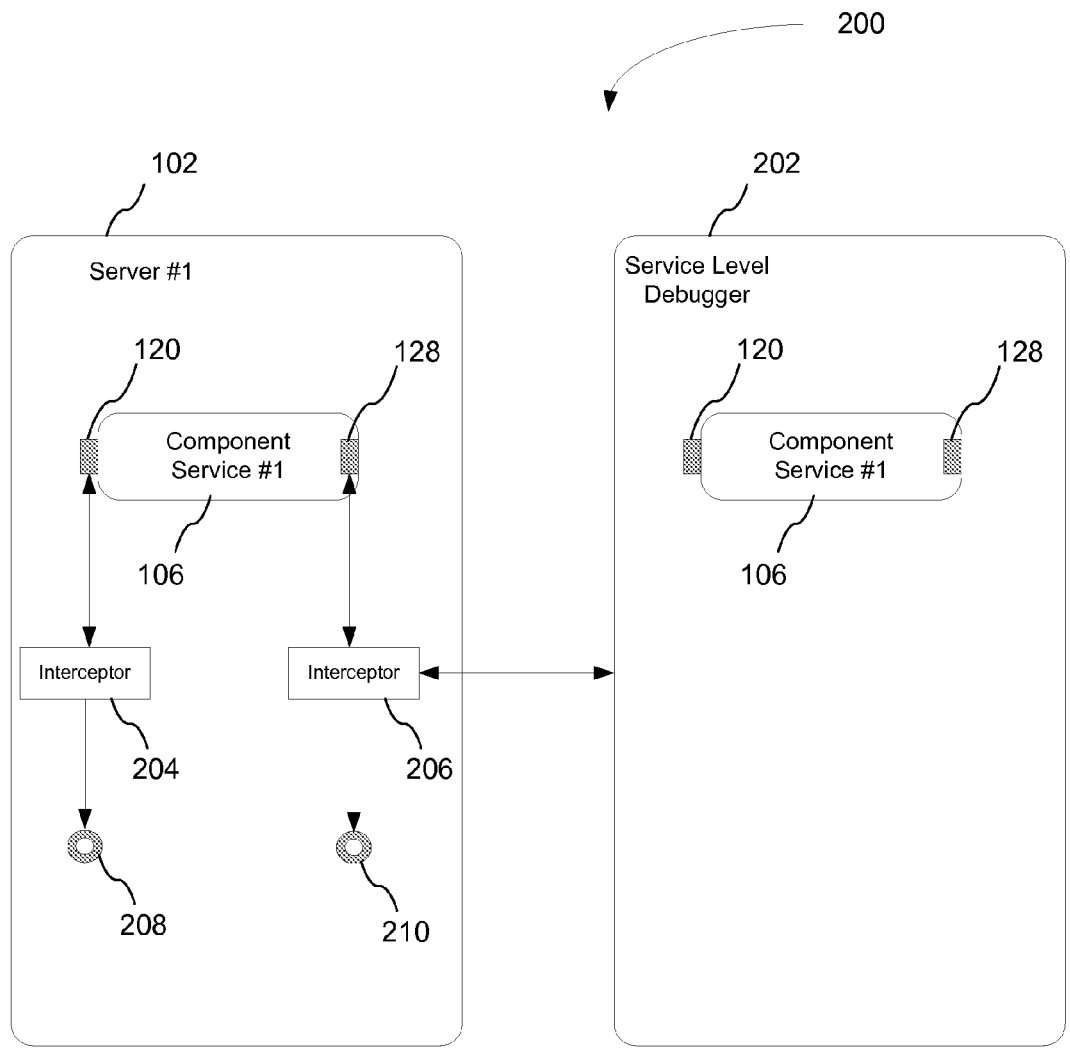
FIG. 2 illustrates a UI configuration that displays an interaction between the first server interacts and a service level debugger.

FIG. 2 illustrates a UI configuration 200 that displays an interaction between the first server 102 interacts and a service level debugger 202. Through the UI configuration 200, a break point can be set at any invocation point, e.g., the interface point 120 or the reference point 128 of the first component service 106. For instance, an interceptor 204 can be utilized to set a break point 208 for the interface point 120 and an interceptor 206 can be utilized to set a break point 210 for the reference point 128.

Accordingly, the first component service 106 can interact with the service level debugger 202 to pause the service invocation at a break point, update the service level debugger 202 with live invocation context, receive modified invocation context from the service level debugger 202 to update to the runtime engine, and continue execution until the service level debugger 202 reaches the next break point.

Figure 3:
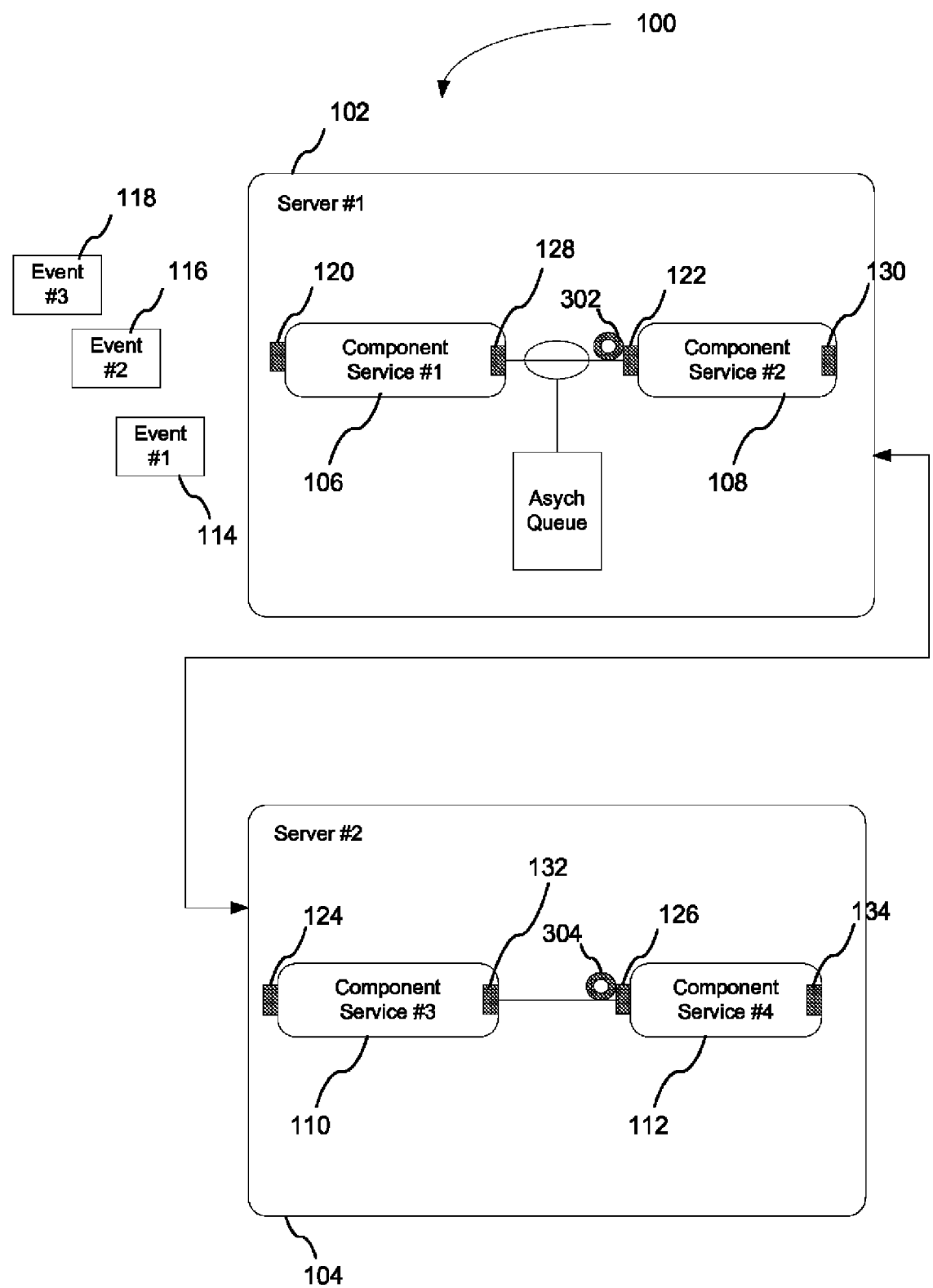
FIG. 3 illustrates the assembly configuration shown in FIG. 1 with break points.

FIG. 3 illustrates the assembly configuration 100 shown in FIG. 1 with break points. In particular, a first break point 302 is inserted before the service invocation of the second component service 108 and a second break point 304 is inserted before the service invocation of the fourth component service 112.

After one or more trace files are loaded, the service level debugger 202 shown in FIG. 2 will display how many events have entered and got executed through the system. The execution logic of any of the events, e.g., the first event 114, the second event 116, or the third event 118 shown in FIG. 3, can be selected for analysis. For example, if the first event 114 is being analyzed, the execution flow will stop at the break point 302 so that the invocation context can be inspected at that break point. Besides the invocation context, traces can be inspected for this break point. Further, the navigation may occur by stepping over to the next service invocation point to inspect invocation context and traces. The navigation may also occur by stepping over to the next break point to inspect invocation context and traces.

In addition, the analysis may include a determination of how changed data affects the execution. Accordingly, modified invocation context can be pushed to the runtime system. Interaction with the runtime interceptor allows inspection of the modified invocation context and traces. In one embodiment, the service level debugger 202 is operably attached to running SOA server that has the interceptor installed.

Figure 4:
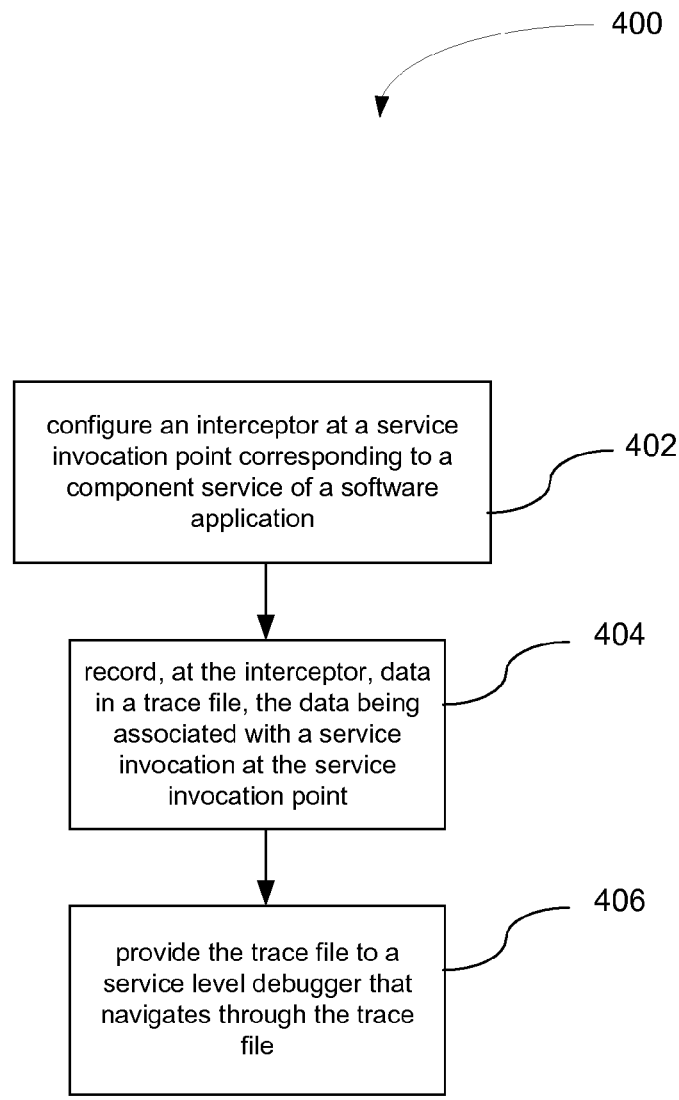
FIG. 4 illustrates a process that is utilized to provide service level debugging of a trace file.

FIG. 4 illustrates a process 400 that is utilized to provide service level debugging of a trace file. At a process block 402, the process 400 configures an interceptor at a service invocation point corresponding to a component service of a software application. Further, at a process block 404, the process 400 records, at the interceptor, data in a trace file. The data is associated with a service invocation at the service invocation point. Finally, at a process block 406, the process 400 provides the trace file to a service level debugger that navigates through the trace file.

Figure 5:
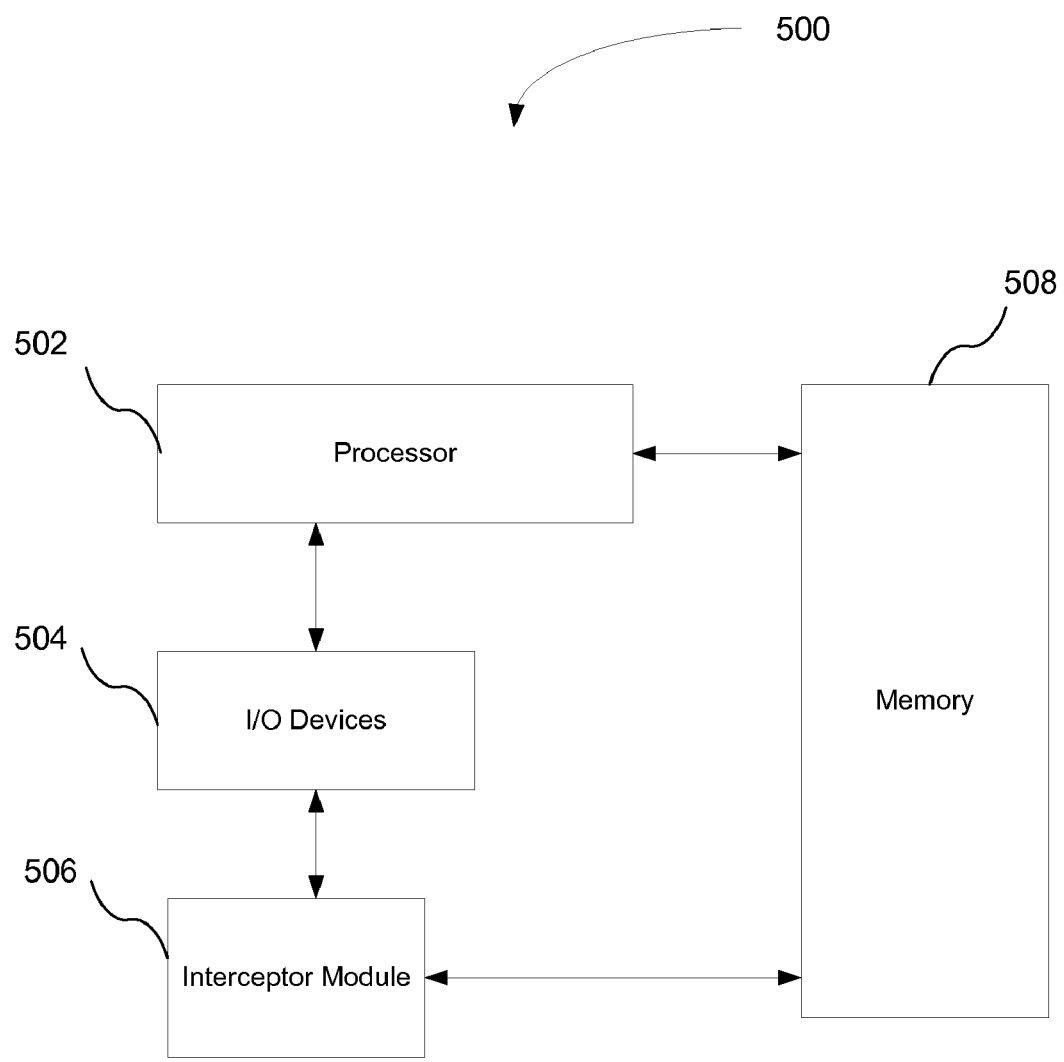
FIG. 5 illustrates a block diagram of a system that utilizes a post-mortem service level debugging architecture.

FIG. 5 illustrates a block diagram of a system 500 that utilizes a post-mortem service level debugging architecture. In one embodiment, the system 500 is suitable for storing and/or executing program code and is implemented using a general purpose computer or any other hardware equivalents. Thus, the system 500 comprises a processor 502, a memory 508, e.g., random access memory ("RAM") and/or read only memory ("ROM"), an interceptor module 506, and various input/output devices 504.

The processor 502 is coupled, either directly or indirectly, to the memory 508 through a system bus. The memory 508 can include local memory employed during actual execution of the program code, bulk storage, and/or cache memories which provide temporary storage of at least some program code in order to reduce the number of times code must be retrieved from bulk storage during execution.

The input/output devices 504 can be coupled directly to the system 500 or through intervening input/output controllers. Further, the input/output devices 504 can include a keyboard, a keypad, a mouse, a microphone for capturing speech commands, a pointing device, and other user input devices that will be recognized by one of ordinary skill in the art. Further, the input/output devices 504 can include a receiver, transmitter, speaker, display, image capture sensor, biometric sensor, etc. In addition, the input/output devices 504 can include storage devices such as a tape drive, floppy drive, hard disk drive, compact disk ("CD") drive, etc.

Network adapters may also be coupled to the system 500 to enable the system 500 to become coupled to other systems, remote printers, or storage devices through intervening private or public networks. Modems, cable modems, and Ethernet cards are just a few of the currently available types of network adapters.

It should be understood that the method and system described herein can take the form of an entirely hardware embodiment, an entirely software embodiment, or an embodiment containing both hardware and software elements. If software is utilized to implement the method or system, the software can include but is not limited to firmware, resident software, microcode, etc.

Further, the method and/or system can take the form of a computer program product accessible from a computer-usable or computer-readable medium providing program code for use by or in connection with a computer or any instruction execution system. For the purpose of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removeable computer diskette, a RAM, a ROM, a rigid magnetic disk and an optical disk. Current examples of optical disks include CD-read only memory ("CD-ROM"), CD-read/write ("CD-R/W") and DVD.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

We claim:

1. A computer program product comprising a computer useable storage medium having a computer readable program stored thereon, wherein the computer readable program when executed on a computer causes the computer to:
   configure an interceptor at a service invocation point corresponding to a component service of a software application;
   record, at the interceptor, data in a trace file, the data being associated with a service invocation at the service invocation point;
   provide the trace file to a service level debugger that navigates through the trace file;
   pause the service invocation at a break point;
   update the service level debugger with a live invocation context;
   receive a modified invocation context from the service level debugger to update a runtime engine; and
   continue execution until the service level debugger reaches a subsequent break point.

2. The computer program product of claim 1, wherein the service level debugger is operable without a server on which the software application is stored being configured in a debugging mode.

3. The computer program product of claim 1, wherein the software application is built on top of a Service Oriented Architecture.

4. A method comprising:
   configuring, with a processor, an interceptor at a service invocation point corresponding to a component service of a software application;
   recording, at the interceptor, data in a trace file, the data being associated with a service invocation at the service invocation point;
   providing the trace file to a service level debugger that navigates through the trace file;
   pausing the service invocation at a break point;
   updating the service level debugger with a live invocation context;
   receiving a modified invocation context from the service level debugger to update a runtime engine; and
   continuing execution until the service level debugger reaches a subsequent break point.

5. The method of claim 4, wherein the service level debugger is operable without a server on which the software application is stored being configured in a debugging mode.

6. The method of claim 4, wherein the software application is built on top of a Service Oriented Architecture.

7. A system having a processor comprising:
   an interceptor that records, in a trace file, data associated with a service invocation, the interceptor located at a service invocation point corresponding to a component service of a software application, the service invocation being at the service invocation point;

a service level debugger that navigates through the trace file; and a component service that pauses the service invocation at a break point, updates the service level debugger with a live invocation context, receives a modified invocation context from the service level debugger to update a runtime engine, and continues execution until the service level debugger reaches a subsequent break point.

8. The system of claim 7, wherein the service level debugger is operable without a server on which the software application is stored being configured in a debugging mode.

* * * * *